(12) United States Patent
Norsworthy et al.

(10) Patent No.: US 12,219,958 B2
(45) Date of Patent: *Feb. 11, 2025

(54) GLUFOSINATE ADDITIVE FOR IMPROVED WEED CONTROL

(71) Applicant: THE BOARD OF TRUSTEES OF THE UNIVERSITY OF ARKANSAS, Little Rock, AR (US)

(72) Inventors: Jason Keith Norsworthy, West Fork, AR (US); Grant Lawson Priess, Springdale, AR (US)

(73) Assignee: THE BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 366 days.

This patent is subject to a terminal disclaimer.

(21) Appl. No.: 17/099,070

(22) Filed: Nov. 16, 2020

(65) Prior Publication Data
US 2021/0145005 A1    May 20, 2021

Related U.S. Application Data

(60) Provisional application No. 62/936,241, filed on Nov. 15, 2019.

(51) Int. Cl.
| | |
|---|---|
| *A61K 31/7064* | (2006.01) |
| *A01N 35/02* | (2006.01) |
| *A01N 37/06* | (2006.01) |
| *A01N 43/16* | (2006.01) |
| *A01N 43/82* | (2006.01) |
| *A01N 43/90* | (2006.01) |
| *A01N 57/12* | (2006.01) |
| *A01N 57/20* | (2006.01) |
| *A61K 31/4439* | (2006.01) |
| *A61K 31/498* | (2006.01) |

(52) U.S. Cl.
CPC ............ *A01N 57/20* (2013.01); *A01N 35/02* (2013.01); *A01N 37/06* (2013.01); *A01N 43/16* (2013.01); *A01N 43/82* (2013.01); *A01N 43/90* (2013.01); *A01N 57/12* (2013.01)

(58) Field of Classification Search
CPC ........ A01N 57/20; A01N 35/02; A01N 37/06; A01N 43/16; A01N 43/82; A01N 43/90; A01N 57/12; A01N 25/30; A01N 37/02; A01N 37/04; A01N 37/10; A01N 37/38; A01N 37/48; A01N 43/42; A01N 43/54; A01N 43/707; A01N 43/88; A01N 57/16
See application file for complete search history.

(56) References Cited

U.S. PATENT DOCUMENTS

| | | | |
|---|---|---|---|
| 2004/0097373 A1 | 5/2004 | Lee et al. | |
| 2005/0049145 A1* | 3/2005 | Bickers | A01N 37/10 504/109 |
| 2005/0120403 A1 | 6/2005 | Van Der Valk | |
| 2010/0247684 A1* | 9/2010 | Reid | A01N 65/12 514/464 |
| 2013/0042366 A1* | 2/2013 | Mankin | C12N 9/0077 800/278 |
| 2014/0066309 A1 | 3/2014 | Schnabel et al. | |

FOREIGN PATENT DOCUMENTS

| | | | |
|---|---|---|---|
| CN | 104886156 A | * | 9/2015 |
| CN | 105410013 A | | 3/2016 |

OTHER PUBLICATIONS

Willowood USA "glufosinate-280-sL" (http://willowoodusa.com/wp-content/uploads/2013/12/Glufosinate-280SL-Spec-Label.pdf), p. 1-21, 2017.*
Lorsban-4E label (https://www.beyondpesticides.org/assets/media/documents/dow/indepth/labels/lorsban-4e.pdf), p. 1-20, 2002.*
Rouse et al. Weed Science, 67(6) : 622-632. 2019. (Year: 2019).*
Lucidcentral (obtained online from Wayback Machine https://web.archive.org/web/20160411214240/ https://keyserver.lucidcentral.org/weeds/data/media/Html/echinochloa_colona.htm.). (Year: 2016).*
Ruiz et al. Peanut, Release Of 'henorico' rhizoma Perennial. "Cultivar and Germplasm Release." J. Agrie. Univ. P.R. vol. 91, No. 1-2, Jan.-Apr. 2007. (Year: 2007).*
Cocke et al. "Managing Insects on Texas Peanuts." Leaflet/Texas Agricultural Extension Service; No. 704. 1982. (Year: 1982).*
International Search Report and Written Opinion for International Patent Application No. PCT/US2020/060716, dated Feb. 17, 2021.

* cited by examiner

*Primary Examiner* — Mina Haghighatian
*Assistant Examiner* — Janice Y Silverman
(74) *Attorney, Agent, or Firm* — Quarles & Brady, LLP

(57) ABSTRACT

Disclosed herein is a herbicide and methods for the control of a grass or a broadleaf weed in a crop. The herbicide comprises an effective amount glufosinate, or a salt thereof, and an effective amount of a metabolic inhibitor.

3 Claims, 9 Drawing Sheets
(1 of 9 Drawing Sheet(s) Filed in Color)

All treatments contained glufosinate at 655 g ai/ha + NIS

All treatments contained glufosinate at 655 g ai/ha + NIS

GLUFOSINATE ADDITIVE FOR IMPROVED WEED CONTROL

CROSS-REFERENCE TO RELATED APPLICATIONS

The present application claims priority to U.S. Provisional Patent Application No. 62/936,241 that was filed Nov. 15, 2019, the entire contents of which are hereby incorporated by reference.

BACKGROUND OF THE INVENTION

Glufosinate is the active ingredient used in more than 20 different herbicide products worldwide. It is a nonselective, postemergence herbicide that controls broadleaf and grass weed species. Glufosinate was brought to market in 1984 and is currently used in 100 crops in 82 countries. Currently, it is mainly used for over-the-top applications in LibertyLink®, Enlist®, and XtendFlex® crops. In 2019, the worldwide market for glufosinate was 280 million US dollars; by 2024, the glufosinate market is expected to grow to 530 million US dollars as Enlist and XtendFlex acres increase.

The efficacy of glufosinate is dependent on environmental conditions at application. Glufosinate preforms best in the following conditions: high light-intensity environments, moist soil, small spray droplets (i.e., to ensure a high percentage of coverage), and a humid climate. As a result, glufosinate has an excellent fit in the mid-southern United States. However, these application parameters often hinder the efficacy and utilization of glufosinate, even in this ideal climate. For example, current recommendations for glufosinate usage only allow applications on sunny and humid days between 9 am and 5 μm. When these application parameters are not followed, subpar weed control often results, leaving the grower with a distaste for the herbicide.

There are currently no known glufosinate-resistant biotypes of Palmer amaranth (*Amaranthus palmeri*) or waterhemp (*Amaranthus tuberculatus*), two of the most important weeds in U.S. agronomic cropping systems. However, resistance eventually develops against all herbicides. It is believed that weeds will acquire resistance to glufosinate through enhanced herbicide metabolism. Weed species such as *Chenopodium album, Digitaria purpurea, Galium vermum, Ipomoea purpurea, Lythrum hyssopifolia, Digitaria purpurea*, and *Amaranthus palmeri* have all shown some degree of glufosinate metabolism. When resistance to glufosinate does evolve, one of the last effective means of chemical control for weeds like *Amaranthus palmeri* becomes ineffective.

Thus, there is a need in the art for a means to improve the efficacy of glufosinate under a range of environmental conditions or increase the sustainable lifetime of this herbicide.

BRIEF SUMMARY OF THE INVENTION

Disclosed herein is a herbicide and methods for the control of a grass or a broadleaf weed in a crop. The herbicide comprises an effective amount glufosinate, or a salt thereof, and an effective amount of a metabolic inhibitor. Suitably the metabolic inhibitor comprises a glutathione S-transferase inhibitor, a glyoxylate pathway inhibitor, or a cytochrome P450 inhibitor. In some embodiments, the metabolic inhibitor is a glutathione S-transferase inhibitor such as 4-chloro-7-nitrobenzofurazan (NBD-CL), chlorphyrifos, diethyl maleate, malathion, or any a combination thereof. In some embodiments, the metabolic inhibitor is a polyphenol such as elegiac acid, curcumin, tannic acid, quercetin, baicalin, caffeic acid, cinnamic acid, or any combination thereof. In some embodiments, the herbicide further comprises an adjuvant.

Another aspect of the invention provides for a method for the control of grasses or broadleaf weeds in a crop. The method comprises applying an effective amount of glufosinate, or a salt thereof, and an effective amount of a metabolic inhibitor to a field having the crop therein. Suitably, the herbicide is applied to the field between sunset and dawn, the effective amount of glufosinate applied to the field is less than the labeled amount for glufosinate application, the field has grasses or broadleaf weeds larger than the labeled size for the effective amount of glufosinate applied to the field, or any combination thereof. In some embodiments, the crop is a glufosinate-resistant crop. Suitably, the crop may be canola, corn, cotton, rice, soybean, or sugar beet.

Another aspect of the invention provides for a method for the inhibition of growth or proliferation of a grass or a broadleaf weed or the killing of the grass or the broadleaf weed. The method comprises applying an effective amount of glufosinate, or a salt thereof, and an effective amount of a metabolic inhibitor to the grass or the broadleaf weed. Suitably, the herbicide is applied to the field between sunset and dawn, the effective amount of glufosinate applied to the field is less than the labeled amount for glufosinate application, the field has grasses or broadleaf weeds larger than the labeled size for the effective amount of glufosinate applied to the field, or any combination thereof. In some embodiments, the grass or the broadleaf weed has low sensitivity to glufosinate.

These and other aspects of the invention will be further described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION OF THE INVENTION

Figure 1:
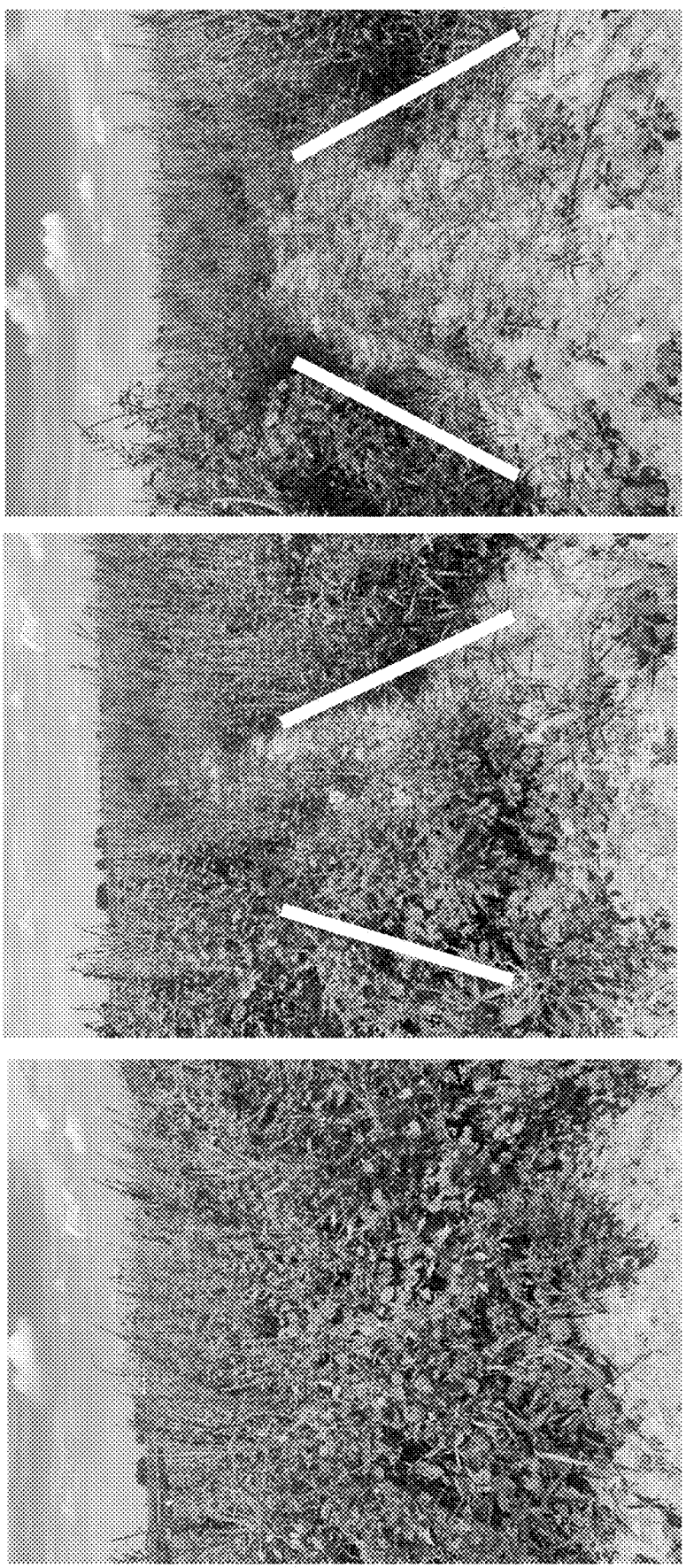
FIG. 1 shows photographs of the results of a field trial experiment taken at 30 days after application. The metabolic inhibitor 4-chloro-7-nitrobenzofurazan (NBD-CL) was mixed with glufosinate at a rate of 6.81 grams active ingredient per acre (g ai $A^{-1}$) and applied at 10 pm under dark conditions (right panel). The results are compared to a field treated with glufosinate alone applied at the labeled rate to larger than labeled weeds at 10 am (middle panel) and to a nontreated field (left panel).

Disclosed herein are compositions and methods for the control of grasses and broadleaf weeds in crops. As demonstrated in the Examples, the combination of a metabolic inhibitor with glufosinate increases the ability to control a variety of grasses and broadleaf weeds, including Palmer amaranth. Moreover, the combination of glufosinate and metabolic inhibitor reduces application limitations. This in turn allows for the compositions disclosed herein to be applied, for example, under low-light conditions, to large grasses or weeds, or at amounts lower than recommended in the art.

The present invention provides for compositions and herbicides comprising an effective amount of glufosinate and an effective amount of a metabolic inhibitor for the control of grass or broadleaf weeds in a crop. In some embodiments, the herbicide comprises an additive such as an adjuvant to enhance herbicidal activity by activating the herbicide or modifying the physical properties of the herbicide. An effective amount of glufosinate is an amount of glufosinate capable of controlling one of more grass or broadleaf weeds in a crop alone or in combination with a metabolic inhibitors disclosed herein. In some embodiments, an effective amount of glufosinate is an amount of glufosinate capable of controlling one or more grass or broadleaf weeds in a crop in combination with a metabolic inhibitor disclosed herein but the same amount of glufosinate without the metabolic inhibitor fails to control the grass or broadleaf weed.

Glufosinate, 2-amino-4-[hydroxy(methyl)phosphoryl]butanoic acid, is a non-proteinogenic alpha-amino acid that is a 2-aminobutanoic acid which is substituted at position 4 by a hydroxy(methyl)phosphoryl group. In some embodiments, glufosinate may be provided as a salt, such as an ammonium salt. Glufosinate is a water-soluble, nonselective, broad-spectrum postemergence herbicide that controls annual and perennial broadleaf and grass weed species in a variety of crops. Glufosinate irreversibly inhibits glutamine synthetase, an enzyme necessary for the production of glutamine and for ammonia detoxification. Thus, application of glufosinate leads to reduced glutamine levels and elevated ammonia levels in plant tissues, halting photosynthesis and resulting in plant death. Glufosinate is the only glutamine synthetase herbicide labeled for use in the United States.

Glufosinate may be used for over-the-top applications in canola, corn, cotton, soybean, rice, and sugar beet, as a foliar spray in trees, vines, and berry crops for control of emerged weeds or broadcast burndown applications prior to planting or crop emergence in labeled row crops. Glufosinate may also be applied in the media, irrigation water, or hydroponic solutions used to propagate plants, or can be applied directly to the foliage of plants being grown in soil or in other media in a field, greenhouse, or plant growth chamber. Treated plants may range in age, and the age at which this herbicide is most effective will depend on the plant being treated.

Products comprising glufosinate benefit from combination with metabolic inhibitors. A metabolic inhibitor is any molecule or substance that inhibits the metabolism of glufosinate. An effective amount of a metabolic inhibitor is an amount of metabolic inhibitor that, when used with an effective amount of glufosinate, improves the control of one or more grass or broadleaf weeds above the use of the same amount of glufosinate alone. As demonstrated in the Examples the use of a metabolic inhibitor with glufosinate has improved efficacy in controlling grasses and broadleaf weeds over the use of glufosinate alone. As also demonstrated by the Examples, the metabolic inhibitor alone may have no ability to control grasses or broadleaf weeds.

Several grass and broadleaf weed species are developing an increased tolerance to glufosinate. Without wishing to be bound by theory, it is believed that tolerance is a result of up regulation or modification of glutathione S-transferase or other enzymes that participate in the metabolism of glufosinate. As a result, these enzymes are responsible for degradation and detoxification of glufosinate. Adding a metabolic inhibitor diminishes or reverses the tolerance that has or may be developed. Accordingly, the metabolic inhibitors used with the present invention may function by inhibiting glutathione-S-transferase (GST), inhibiting the glyoxylate pathway, inhibiting a cytochrome P450, detoxification of reactive oxygen species (ROS), and the like. In some embodiments, the compositions and methods may comprise the use of two or more different metabolic inhibitors. When two or more different metabolic inhibitors are used, the metabolic inhibitors may employ the same or different function.

In some embodiments, the metabolic inhibitor is a glutathione-S-transferase (GST) inhibitor. A GST inhibitor is a compound or substance that inhibits glutathione-S-transferase (GST). Suitably, the GST inhibitor may inhibit GST by at least 10%, 20%, 30%, 40%, 50%, 60%, 70%, 80%, 90%, or 99%. The extent of inhibition may be measured through methodologies recognized in the art for determining such. Metabolic inhibitors may include both peptidomimetic and synthetic inhibitors. Suitable inhibitors may include, without limitation, 4-chloro-7-nitrobenzofurazan (NBD-CL), curcumin, baicalin, baicalein, elegiac acid, quercetin, morin, butein, 2-hydroxyl chalcone, tannic acid, quercetin, diethyl malate, malathion (diethyl 2-[(dimethoxyphosphorothioyl)sulfanyl]butanedioate), chlopyrifos (O,O-Diethyl O-3,5,6-trichloropyridin-2-yl phosphorothioate), ethacrynic acid, phloridzin, isofuranonapthoquinone, sesquiterpene lactone, gossypol, 6-(7-nitro-2,1,3-benzoxadiazol-4-ylthio) hexanol, piriprost, catechin, resveratrol, hesperidin, coniferyl ferulate, 1-chloro-2,4-dinitrobenzene (CDNB), kaemferol, genistein, and γ-glutamyl-S-(benzyl)-cysteinyl-R(−)-phenylglycine diethyl ester (TLK199, ezatiostat, Telintra®). In certain embodiments, the metabolic inhibitor is 4-chloro-7-nitrobenzofurazan (NBD-CL).

In some embodiments, the metabolic inhibitor is a glyoxylate pathway inhibitor. The glyoxylate pathway or cycle is an anabolic pathway that allows for the conversion of acetyl-CoA to succinate for the synthesis of carbohydrates. Suitably, the glyoxylate pathway inhibitor may inhibit an enzyme used in the glyoxylate pathway by at least 10%, 20%, 30%, 40%, 50%, 60%, 70%, 80%, 90%, or 99%. The extent of inhibition may be measured through methodologies recognized in the art for determining such. Suitable glyoxylate pathway inhibitors include, without limitation, caffeic acid and cinnamic acid.

In some embodiments, the metabolic inhibitor is a cytochrome P450 inhibitor. Cytochrome P450 are a superfamily of monooxygenases containing a heme as a cofactor. Cytochrome P450s are involved in a wide range of biosynthetic reactions and target a diverse range of biomolecules. These reactions lead to various fatty acid conjugates, plant hormones, secondary metabolites, lignins, and a variety of other compounds. Suitably, the cytochrome P450 inhibitor r may inhibit a cytochrome P450 enzyme by at least 10%, 20%, 30%, 40%, 50%, 60%, 70%, 80%, 90%, or 99%. The extent of inhibition may be measured through methodologies recognized in the art for determining such.

In some embodiments, the metabolic inhibitor is a ROS inducer. ROS are highly reactive chemical molecules formed due to the electron acceptability of $O_2$. Examples of ROS include peroxides, superoxide, hydroxyl radical, singlet oxygen, and alpha-oxygen. The production of ROS is strongly influenced by a stress response in plants. ROS inducers result in increased ROS production that can result in significant damage to cell structures, DNA, RNA, proteins, and the like. Suitable ROS inducers include, without limitation, saflufenacil (N'-{2-Chloro-4-fluoro-5-[1,2,3,6-tetrahydro-3-methyl-2,6-dioxo-4-(trifluoromethyl)pyrimidin-1-yl]benzoyl}-N-isopropyl-N-methylsulfamide), metribuzin (4-Amino-6-tert-butyl-3-methylsulfanyl-1,2,4-triazin-5-one), paraquat (1,1'-Dimethyl-4,4'-bipyridinium dichloride), and bentazon (3-Isopropyl-1H-2,1,3-benzothiadiazin-4 (3H)-one 2,2-dioxide).

In some embodiments, the metabolic inhibitor is a polyphenol. Polyphenols may include flavoinoids (such as flavones, flavonols, flavanols, flavanones, isoflavones, proanthocyanidins, flavoninoid alkaloids, and anthocyanins), phenolic acids, and lignans. Polyphenols may inhibit the metabolism of glufosinate in one or more different ways. For example, some polyphenols may inhibit GST, the glyoxylate pathway, and/or a cytochrome P450. Notably, this group of inhibitors includes several that are considered safe for human consumption such as, curcumin, baicalin, tannic acid, elegiac acid, caffeic acid, and quercetin.

Glufosinate can be used by itself, in combination with the metabolic inhibitor, or as part of a herbicide formulation that additionally contains other additives. Suitably, the formulations may be provided as a solution, emulsion, suspension, dust, powder, paste, or granule. The use form of a herbicide depends on the particular intended purpose. In each case, the formulation should be prepared to ensure a fine and even distribution of the glufosinate and metabolic inhibitor.

Additives that may be found in a herbicide formulation include another herbicide or an adjuvant, such as a wetting agent, penetrant, spreader, co-solvent, deposit builder, stabilizing agent, emulsifier, anti-foam agent, buffering agent, compatibility agent, drift control agent, fertilizer, or the like. The herbicide formulation can be a wet or dry preparation and can include, but is not limited to, flowable powders, emulsifiable concentrates and liquid concentrates. Such formulations are prepared in a known manner, for example by extending the active compound with auxiliaries suitable for the formulation of agrochemicals, such as solvents and/or carriers, emulsifiers, surfactants and dispersants, preservatives, antifoaming agents, anti-freezing agents, and also optionally colorants and/or binders and/or gelling agents.

In some embodiments, surfactants are used in combination with glufosinate and the metabolic inhibitor. Surfactants increase surface contact, reduce runoff, and increase leaf penetration, and may function as a spreader, deposit builder, emulsifier, wetting agent, or the like. Surfactants are activator agents that enhance herbicide performance. The surfactant may be a nonionic surfactant (NIS). NIS are water soluble chemical and lipid compounds that are not molecularly charged (positive or negative). Anionic (negatively charged), cationic (positively charged), or amphoteric (positivity and negatively charged) surfactants may also be employed. Suitably, the nonionic surfactant may comprise one or more of dimethylpolysiloxanes, alkanolamides, free fatty acids, alkyl aryl polyoxylkane ethers, and other nonionic surfactants suitable for agricultural use. Surfactants reduce the surface tension of the water molecule enabling the water droplet to cover a greater leaf surface area.

In some embodiments, oils are used in combination with glufosinate and the metabolic inhibitor. Oils, such as crop oil concentrates, crop oil, including methylated seed oil, and vegetable oil may be used to slow the drying of the herbicide droplet on the leaf surface, increase herbicide absorption, improve penetration, and the like.

The present invention provides methods for the control of grasses or broadleaf weeds in a crop. The method also provides for methods for the inhibition of growth or proliferation of a grass or a broadleaf weed or the killing of the grass or the broadleaf weed. The methods involve applying an effective amount of glufosinate and an effective amount of a metabolic inhibitor to a field comprising a crop or to the grass or broadleaf weed. The glufosinate and metabolic inhibitor may be applied either as a combined formulation or as separate formulations.

As used herein, weed control refers to any observable measure of control of plant growth, which can include one or more of the actions of killing, inhibiting growth, reproduction or proliferation, and removing, destroying, or otherwise diminishing the occurrence and activity of plants. Weed control can be measured by any of the various methods known in the art. For example, weed control can be determined as a percentage as compared to untreated plants following a standard procedure wherein plant mortality and growth reduction is visually assessed by one skilled in the art. Control may be defined, for instance, in terms of mean plant weight reduction or percentage of plants that fail to emerge following preemergence herbicide application. A "commercially acceptable rate of weed control" varies with the weed species, degree of infestation, environmental conditions, and the associated crop plant. Typically, commercially effective weed control is defined as the destruction (or inhibition) of at least about 60%, 65%, 70%, 75%, 80%, or even at least 85%, or even at least 90% of the weed plants. Although it is generally preferable from a commercial viewpoint that 70-80% or more of the weeds be destroyed, commercially acceptable weed control can occur at much lower destruction or inhibition levels, particularly with some very noxious, herbicide-resistant plants.

In some embodiments, weed control is effected with a commercially acceptable amount of injury to the crop. A "commercially acceptable amount of injury" is an amount of injury that leave some or all of the crop commercially viable for the crop's intended use without significant yield loss caused by the herbicide. Crop injury may be measured by evaluating wilting, stunting, yellowing, plant tissue deformation, or plant tissue death by methodologies known in the art. A commercially acceptable amount of injury may varies with the crop species, degree of infestation, environmental conditions, and the associated grass or broadleaf weed infesting the crop. Typically, commercially acceptable amount of injury is less than about 25%, 20%, 15%, 10%, 5%, or even at least 5%. In certain embodiments, the amount of crop injury when the effective amount of glufosinate and the effective amount the metabolic inhibitor is substantially the same as or no more than 50%, 40%, 30%, 20%, or 10% greater than the use of the same amount of glufosinate alone.

Glufosinate is used to control a wide range of broadleaf and grass weed species. The methods of the present invention may be used to treat any weed that is affected by glufosinate, including, without limitation, Palmer amaranth (*Amaranthus palmeri*), waterhemp (*Amaranthus tuberculatus*), *Lolium* spp. and other grasses, *Conyza* spp. Malvaceae, morningglories, hemp *sesbania* (*Sesbania bispinosa*), Pennsylvania smartweed (*Polygonum pensylvanicum*), and yellow nutsedge. Exemplary grass and broadleaf weeds that may be controlled with glufosinate are shown in Tables 1-7.

TABLE 1

Broadleaf weed control by glufosinate in row crops, e.g., canola, corn, cotton, and soybean.
Broadleaf Weed Control

| Weed Species | Maximum Weed Height or Diameter (Inches) | |
|---|---|---|
| | 0.40 lb ai/A | 0.53 lb ai/A |
| Amaranth, Palmer | Not recommended | 4 |
| Anoda, Spurred | 3 | 5 |
| Beggarweed, Florida | 4 | 5 |
| Black, medic | 5 | 7 |
| Blueweed, Texas | 5 | 7 |

TABLE 1-continued

Broadleaf weed control by glufosinate in row crops, e.g., canola, corn, cotton, and soybean.
Broadleaf Weed Control

| Weed Species | Maximum Weed Height or Diameter (Inches) | |
|---|---|---|
| | 0.40 lb ai/A | 0.53 lb ai/A |
| Buckwheat, wild | 6 | 7 |
| Buffalobur | 6 | 7 |
| Burcucumber | 6 | 10 |
| Catchweed bedstraw (cleavers) | 2 | 4 |
| Carpetweed | 4 | 6 |
| Chickweed, common | 6 | 8 |
| Cocklebur, common | 6 | 14 |
| Copperleaf, hophornbeam | 4 | 6 |
| Cotton, volunteer | 6 | 8 |
| Croton, tropic | 3 | 5 |
| Croton, wooly | 2 | 4 |
| Eclipta | 4 | 6 |
| Devil's claw | 2 | 4 |
| Fleaban, annual | 6 | 8 |
| Galinsoga, hairy | 6 | 8 |
| Galinsoga, small flower | 6 | 7 |
| Groundcherry, cutleaf | 4 | 5 |
| Geranium, cutleaf | 4 | 6 |
| Hempnettle | 4 | 6 |
| Horsenettle, Carolina | 2 | 4 |
| Jimsonweed | 6 | 10 |
| Knotweed | 3 | 5 |
| Kochia | 4 | 6 |
| Ladysthumb | 6 | 14 |
| Lambsquarters, common | 4 | 6 |
| Mallow, common | 4 | 6 |
| Marestail | Suppression | 6-12 |
| Marshelder, annual | 4 | 6 |
| Morningglory, entireleaf | 6 | 8 |
| Morningglory, ivyleaf | 6 | 8 |
| Morningglory, pitted | 6 | 8 |
| Morningglory, sharppod | 2 | 4 |
| Morningglory, smallflower | 4 | 6 |
| Morningglory, tall | 6 | 8 |
| Mustard, wild | 4 | 6 |
| Nightshade, black | 4 | 6 |
| Nightshade, eastern black | 6 | 8 |
| Nightshade, hairy | 6 | 8 |
| Pennycress (stinkweed) | 4 | 6 |
| Pigweed, redroot | 3 | 4 |
| Pigweed, prostrate | 3 | 4 |
| Pigweed, spiny | 3 | 4 |
| Pigweed, smooth | 3 | 4 |
| Pigweed, tumble | 3 | 4 |
| Puncturevine | 4 | 6 |
| Purslane, common | 2 | 4 |
| Pusley, Florida | Suppression | 3 |
| Ragweed, common | 6 | 10 |
| Ragweed, giant | 6 | 12 |
| Senna coffee | 4 | 6 |
| Sesbania, hemp | 6 | 8 |
| Shepherdspurse | 6 | 8 |
| Sicklepod (java bean) | 4 | 6 |
| Sida, prickly | 4 | 5 |
| Smartweed, Pennsylvania | 6 | 14 |
| Smellmelon | 4 | 6 |
| Sowthistle, annual | 6 | 8 |
| Soybeans, volunteer | 6 | 8 |
| Spurge, prostate | 2 | 4 |
| Spurge, spotted | 2 | 4 |
| Starbur, bristly | 4 | 6 |
| Sunflower, common | 6 | 14 |
| Sunflower, praire | 3 | 5 |
| Sunflower, volunteer | 6 | 10 |
| Thistle, Russian | Suppression | 6-12 |
| Velvetleaf | 3 | 4 |
| Waterhemp, common | Not recommended | 5 |
| Waterhemp, tall | Not recommended | 5 |

TABLE 2

Grass weed control in row crops using glufosinate.
Grass Weed Control

| Weed Species | Maximum Weed Height or Diameter (Inches) | |
|---|---|---|
| | 0.40 lb ai/A | 0.53 lb ai/A |
| Barley, volunteer | 3 | 4 |
| Barnyardgrass | 3 | 5 |
| Bluegrass, annual | 3 | 5 |
| Corn, volunteer | 10 | 12 |
| Crabgrass, large | 3 | 5 |
| Crabgrass, smooth | 3 | 5 |
| Cupgrass, woolly | 6 | 12 |
| Foxtail, bristly | 6 | 8 |
| Foxtail, giant | 6 | 12 |
| Foxtail, green | 6 | 12 |
| Foxtail, robust purple | 6 | 8 |
| Foxtail, yellow | 3 | 4 |
| Goosegrass | 2 | 3 |
| Johnsongrass, seedling | 3 | 5 |
| Junglerice | 3 | 5 |
| Millet, proso volunteer | 6 | 7 |
| Oat, wild | 3 | 4 |
| Panicum, fall | 3 | 5 |
| Panicum, Texas | 4 | 6 |
| Rice, red | 4 | 6 |
| Rice, volunteer | 4 | 6 |
| Sandbur, field | Suppression | 2 |
| Shattercane | 6 | 8 |
| Signalgrass, broadleaf | 3 | 5 |
| Sprangletop | 4 | 6 |
| Sorghum, volunteer | 6 | 8 |
| Stinkgrass | 4 | 6 |
| Wheat, volunteer | 4 | 5 |
| Witchgrass | 4 | 6 |

TABLE 3

Biennial and perennial weed control in row crops treated with glufosinate.
Biennial and Perennial Weed Control
For control of biennial and perennial weeds listed below, sequential applications of 0.40 lb ai/A followed by 0.4 lb ai/A will provide the best results

| | | |
|---|---|---|
| Alfalfa | Clover, Alsike | Nutsedge, purple |
| Artichoke, Jerusalem | Clover, red | Nutsedge, yellow |
| Burmudagrass | Dandelion | Orchardgrass |
| Blindweed, field | Dock, smooth | Poinsettia, wild |
| Blindweed, hedge | Dogbane, hemp | Pokeweed |
| Bluegrass, Kentucky | Milkweed, common | Quackgrass |
| Blueweed, Texas | Johnsongrass, rhizome | Sowthistle, perennial |
| Bromegrass, smooth | Goldenrod, gray | Thistle, bull |
| Burdock | Milkweed, honeyvine | Thistle, Canada |
| Bursage, woolyleaf | Muhly, wirestem | Timothy |
| Chickweed, mouse-ear | Nightshade, silverleaf | Wormwood, biennial |

TABLE 4

Broadleaf weed control in sugar beet treated with the indicated amount of glufosinate.
Broadleaf Weed Control

| Weed Species | Growth Stage of Weed (Maximum weed diameter) | |
|---|---|---|
| | 0.27 lb ai/A | 0.37 lb ai/A |
| Buckwheat, wild | 1-4 leaf (2) | 5-6 leaf (3) |
| Buffalobur | 1-4 leaf (2) | 5-6 leaf (3) |
| Carpetweed | — | 1-4 leaf (2) |
| Chickweed, common | 1-4 leaf (2) | 5-6 (3) |
| Cocklebur, common | 1-6 leaf (3) | 78 leaf (5) |
| Kochia | — (1) | — (2) |
| Ladysthumb | 1-2 leaf (1) | 3-4 leaf (3) |
| Lambsquarter, common | 1-2 leaf (1) | 3-4 leaf (3) |
| Mallow, Venice | 1-4 leaf (2) | 5-6 leaf (3) |
| Marshelder | 1-2 leaf (1) | 3-4 leaf (2) |
| Mustard, wild | 1-4 leaf (2) | 5-6 leaf (3) |
| Nightshade, eastern black | 1-4 leaf (2) | 5-6 leaf (3) |
| Pigweed, prostate | — (1) | — (3) |
| Pigweed, redroot | 1-2 leaf (1) | 3-4 leaf (3) |
| Pigweed, smooth | 1-2 leaf (1) | 3-4 leaf (3) |
| Pigweed, spiny | 1-2 leaf (1) | 3-4 leaf (3) |
| Purslane common | — (1) | — (2) |
| Ragweed, common | 1-6 leaf (3) | 7-8 leaf (5) |
| Ragweed, giant | 1-4 leaf (2) | 5-6 leaf (3) |
| Shepherdspurse | 1-4 leaf (2) | 5-6 leaf (3) |
| Smartweed, Pennsylvania | 1-2 leaf (1) | 3-4 leaf (3) |
| Sowthistle, annual | 1-4 leaf (2) | 5-6 leaf (3) |
| Sunflower, common | 1-6 leaf (3) | 7-8 leaf (5) |
| Thistle, Russian | — (1) | — (2) |
| Velvetleaf | 1-2 leaf (1) | 3-4 leaf (3) |

TABLE 5

Grass weed control in sugar beet treated with glufosinate at the indicated rate.
Grass Weed Control

| Weed Species | Growth Stage of Weed (Maximum weed height in inches) | | Comments on weed growth stage, application time, or number of applications |
|---|---|---|---|
| | 0.27 lb ai/A | 0.37 lb ai/A | |
| Barley, volunteer | 1-2 leaf (2) | 3 leaf (3) | Multiple applications |
| Barnyardgrass | 1-3 leaf (2) | 4-5 leaf (3) | Maximum 1 tiller |
| Corn, volunteer | 1-2 leaf (3) | 3-4 leaf (6) | |
| Crabgrass, large | 1-3 leaf (2) | 4-5 leaf (3) | Maximum 1 tiller |
| Crabgrass, smooth | 1-3 leaf (2) | 4-5 leaf (3) | Maximum 1 tiller |
| Cupgrass, woolly | 1-5 leaf (4) | — (8) | |
| Foxtail, giant | 1-4 leaf (3) | 5-6 leaf (4) | Maximum 2 tillers |
| Foxtail, green | 1-4 leaf (3) | 5-6 leaf (4) | Maximum 2 tillers |
| Foxtail, yellow | 1-3 leaf (1) | 4 leaf (2) | Apply prior to tillering |
| Millet, volunteer proso | 1-3 leaf (2) | 4-5 leaf (3) | Maximum 1 tiller |
| Millet, wild proso | 1-3 leaf (2) | 4-5 leaf (3) | Maximum 1 tiller |
| Oat, wild | 1-2 leaf (2) | 3 leaf (3) | Maximum 1 tiller |
| Panicum, fall | 1-3 leaf (2) | 4-5 leaf (3) | |
| Panicum, Texas | 1-3 leaf (2) | 4-5 leaf (3) | Maximum 1 tiller |
| Sandbur, field | — (—) | 1-4 leaf (2) | Apply prior to tillering |
| Wheat, volunteer | 1-2 leaf (2) | 3 leaf (3) | Maximum 1 tiller |

TABLE 6

Perennial weed control in sugar beet after treatment with the indicated amount of glufosinate.

| Weed Species | Growth Stage of Weed (Maximum weed height in inches) 0.27 lb ai/A | Growth Stage of Weed (Maximum weed height in inches) 0.37 lb ai/A | Comments on number of applications |
|---|---|---|---|
| Quackgrass | — | 1-3 leaf (3) | Multiple applications |
| Sowthistle, perennial | — | 1-4 leaf (3) | Multiple applications |
| Thistle, Canada | — | 1-4 leaf (6) | Multiple applications |

TABLE 7

Weed control in berries using glufosinate at the indicated rate.

| Weed Height in inches | Use Rate/A |
|---|---|
| Weeds <3" in height | 0.88 lb ai/A |
| Weeds <6" in height | 1.02 lb ai/A |
| Weeds >6" in height and/or grasses that have tillered | 1.02-1.50 lbs ai/A |

Broadleaf Weed Control

| | | | |
|---|---|---|---|
| Alkali sida | Ammannia purple | Arrowhead, California | Buckwheat, wild |
| Buffalobur | Burclover, California | Carpetweed | Chickweed, common |
| Chinese thornapple | Cockebur, common | Copperleaf, Virginia | Cudweed |
| Cutleaf eveninprimrose | Dodder | Eclipta | Fiddleneck |
| Filaree | Filaree, redstrm | Fleabane, annual | Goosefoot |
| Cromwell, field | Groundcheery, cutleaf | Groundsel, common | Henbit |
| Jimsonweed | Knotweed | Kochia | Lambsquarters, common |
| Lettuce, miner's | Lettuce, prickly | London rocket | Mallow, common |
| Malva (little mallow) | Marestail | Mayweed | Morningglory, entireleaf |
| Morningglory, ivyleaf | Morningglory, pitted | Mullein, turkey | Mustard, wild |
| Nightshade, black | Nightshade, eastern black | Nightshade, hairy | Pennycress |
| Pigweed, redroot | Pineapple weed | Puncturevine | Purslane, common |
| Radish, wild | Ragweed, common | Ragweed, giant | Redmaids |
| Shepherdspurse | Smartweed, Pennsylvania | Sowthistle, annual | Spurge, prostate |
| Starthistle, yellow | Sunflower, common | Sunflower, prairie | Sunflower, volunteer |
| Swinecress | Thistle, Russian | Turnip, wild | Velvetleaf |
| Vervain | Vetch | Virginia copperleaf | Willowherb, panicle |
| Nettle | | | |

Grass Weed Control

| | | | |
|---|---|---|---|
| Barnyardgrass | Bluegrass, annual | Brome, ripgut | Bromegrass, downy |
| Canarygrass | Chess, soft | Crabgrass, large | Crabgrass, smooth |
| Cupgrass, wooly | Foxtail, giant | Foxtail, green | Foxtail, yello |
| Goosgrass | Johnsongrass, seedling | Junglerice | Oat, wild |
| Panicum, fall | Panicum, Texas | Rush, toad | Rygrass, annual |
| Sandbur, field | Shattercane | Sprangletop | Stinkgrass |
| Wheat, volunteer | Windgrass | Witchgrass | |

Biennial and Perennial Weed Control

| | | | |
|---|---|---|---|
| Aster, white heath | Bindweed, field | Bindweed, hedge | Bluegrass, Kentucky |
| Bromegrass, smooth | Bulrush | Burdock | Canada thistle |
| Clover, alsike | Clover, red | Clover, white | Dallisgrass |
| Dandelion | Dock, curly | Dogbank (hemp) | Fescue |
| Goldenrod, gray | Guineagrass | Horstail | Lovegrass |
| Mugwort | Mullein, common | Mustard, tansy | Nutsedge, purple |
| Nutsedge, yellow | Onion, wild | Orchardgrass | Paragrass |
| Plantain | Poison ivy/oak | Quackgrass | Rocket, yellow |
| Rose, wild | *Rubus* spp. | Spurge, leafy | Thistle, bull |
| Thistle, musk | Torpedograss | Vaseygrass | Woodsorrel |
| Yarrow, common | | | |

An advantage of the present invention is that it allows for glufosinate to be effective when applied under a wider range of environmental conditions. By making the herbicide less dependent on environmental conditions, weed control becomes more consistent. Current recommendations for glufosinate usage allow for application on only sunny and humid days during daylight hours. Accordingly, glufosinate without co-application of a metabolic inhibitor demonstrates inferior performance between sunset and dawn. In the Examples, the inventors demonstrate that the combination treatment is effective when applied under low light conditions after sunset (10 pm). This allows for treatment outside the narrow recommended range between dawn and 2 hours prior to sunset. Thus, in some embodiments, the herbicide treatment is applied under low light conditions or under low humidity conditions.

Another advantage of the present invention is that combining glufosinate with a metabolic inhibitor makes it a more efficacious herbicide (In dark conditions). Thus, commercially acceptable rates of weed control are achievable with less glufosinate being applied using the combination treatment disclosed herein. Suitably, the effective amount of glufosinate applied to a field or weed may be less than the labeled amount of glufosinate for the desired application. Labeled amount refers to the art recognized amount of glufosinate that should be applied to a particular weed for effective control. In some embodiments, the effective amount of glufosinate applied to a field or weeds is less than 1.5 lb ai/A, 1.02 lb ai/A, 0.88 lb ai/A, 0.53 lb ai/A, 0.40 lb ai/A, 0.37 lb ai/A, 0.27 lb ai/A. Examples of the labeled amount of herbicide comprising 2.34 pounds of glufosinate-ammonium per U.S. gallon for particular applications is show in Tables 1-7.

Another advantage of the present invention is that the combination of glufosinate with a metabolic inhibitor may be used to treat weeds that are larger than the labeled weed size. Labeled weed size refers to a maximal size at which a herbicide should be applied to a particular weed for effective control. For example, the label requires that Palmer amaranth is less than 4 inches tall at application for effective control by glufosinate. In the Examples, the inventors demonstrate that in combination with a metabolic inhibitor, glufosinate can be used to control Palmer amaranth that have grown larger than the labeled weed size. In some embodiments, the effective amount of glufosinate applied to a weed greater than 2, 3, 4, 5, 6, 7, 8, 9, 10, 11, 12, 13, or 14 inches in height. Examples of the label weed size to be controlled with a herbicide comprising 2.34 pounds of glufosinate-ammonium per U.S. gallon for particular applications is show in Tables 1-7.

Further, combining glufosinate with the metabolic inhibitor broadens the spectrum of weed control of this herbicide. Thus, the methods of the present invention may be used to treat weeds that show low sensitivity to glufosinate or are resistant to glufosinate. Low sensitivity means that the full rate of the herbicide is typically needed to achieve acceptable control. For example, several weed species, including *Chenopodium album*, *Digitaria ischaemum*, *Echinochloa crus-galli*, *Galium vernum*, *Ipomoea purpurea*, *Lythrum hyssopifolia*, *Digitaria sanguinalis*, and *Amaranthus palmeri* have a low sensitivity to glufosinate because they are able to metabolize this herbicide to some degree. As used herein, the term "resistant" is used to describe a plant that is not controlled by a labeled rate of a herbicide at a level that once killed or adequately inhibited the growth of a normal or wild-type plant.

One of skill in the art will appreciate that application rates of glufosinate and metabolic inhibitor may need to be adjusted based on several factors such as the crop being grown, the weed being treated, the metabolic inhibitor being used and the environmental conditions. In some embodiments, the glufosinate is applied at a rate of 1-700, 1-600, 1-500, 1-400, or 1-300 g ai/acre. In some embodiments, the glufosinate is applied at a rate of 200-275 g per acre. Likewise, the rate of metabolic inhibitor application may be varied. Suitably, the metabolic inhibitor is applied at a rate of 0.05-500, 0.05-400, 0.05-300, or 0.05-200 g ai/acre. In some embodiments, the metabolic inhibitor is applied at a rate of 1-150 g per acre.

Another advantage of the present invention is that the herbicide treatments provided herein may help to delay the development of resistance to glufosinate in weeds, extending the lifespan of this herbicide. Unfortunately, resistance eventually develops against all herbicides. However, by applying this herbicide in combination with a metabolic inhibitor, one may prevent weeds with an increased ability to metabolize the herbicide from prospering, and, thus, slow the evolution of glufosinate resistance.

The methods of the present invention may be used to grow any crop that can tolerate glufosinate at the applied rate. Glufosinate is most commonly used with canola, corn, cotton, rice, soybean, and sugar beet, but it is also used with root and tuber vegetables, leafy vegetables, brassica leafy vegetables, small grains (e.g., barley, buckwheat, oats, rye, teosinte, triticale, and wheat) and berries. In some embodiments, the treated crop is resistant to glufosinate. Many crops that are resistant to glufosinate were created by genetic engineering. Thus, in some embodiments, the treated crop is transgenic or genetically modified to be resistant to glufosinate. As used herein, the term "transgenic" describes an organism or cell that contains genetic material that has been artificially introduced.

The herbicide treatments of the present invention may be applied in combination with other pesticidally active substances, such as other herbicides, fungicides or insecticides. Applying several herbicides with distinct mechanisms of action may be useful, for example, for treating fields with herbicide-resistant weeds such as barnyardgrass. The herbicide treatments may also be applied in combination with safeners, fertilizers and/or growth regulators, for example in the form of a ready mix or a tank mix.

Unless otherwise specified or indicated by context, the terms "a", "an", and "the" mean "one or more." For example, "a molecule" should be interpreted to mean "one or more molecules."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion additional components other than the components recited in the claims.

The term "consisting essentially of" should be interpreted to be partially closed and allowing the inclusion only of additional components that do not fundamentally alter the nature of the claimed subject matter.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

EXAMPLES

Example 1

Figure 2:
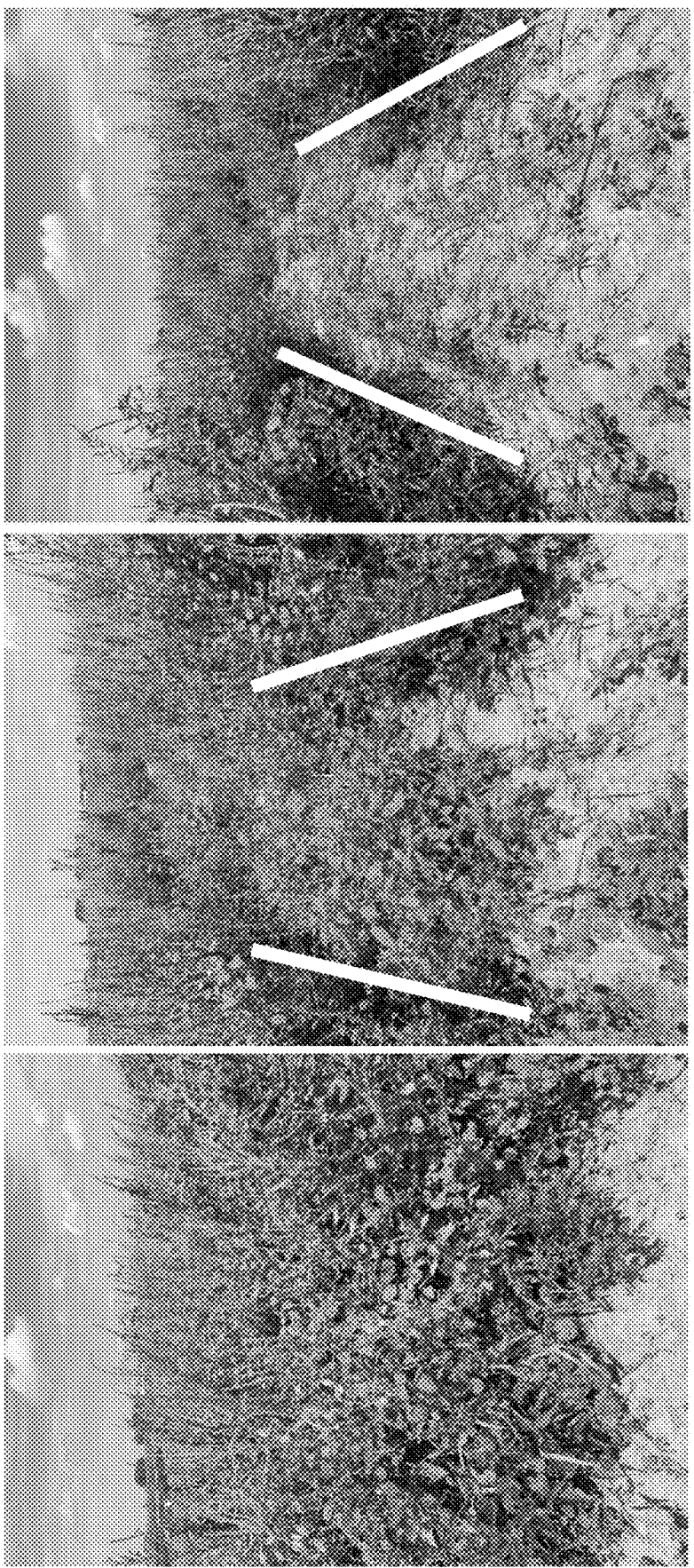
FIG. 2 shows photographs of the results of the same field experiment described in FIG. 1 taken 30 days after application. Again, NBD-CL was mixed with glufosinate at a rate of 6.81 g ai $A^{-1}$ and applied at 10 pm (right panel). The results are compared to a field treated with glufosinate alone applied at the labeled rate at 10 pm (middle panel) and to a nontreated field (left panel).
Figure 3:
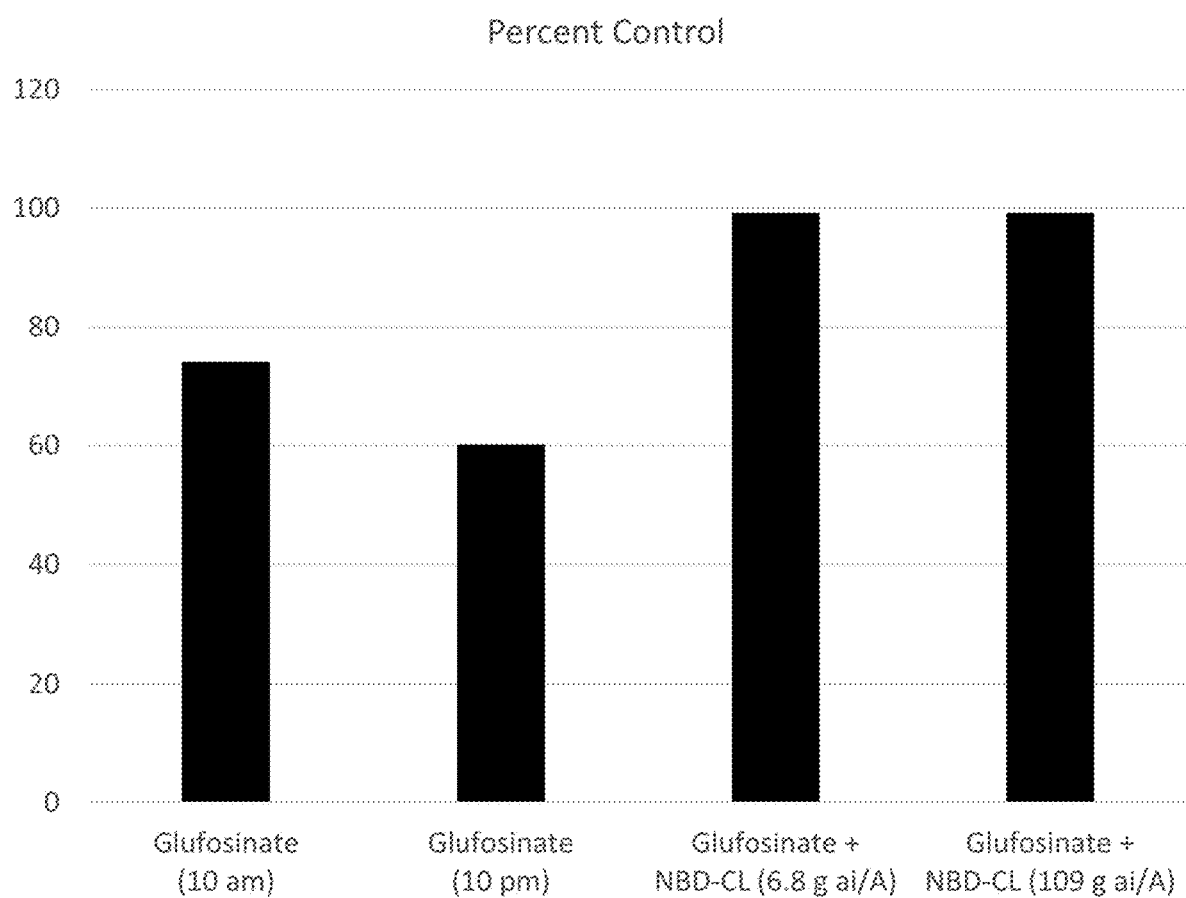
FIG. 3 shows a graph depicting the results of the field experiment described in FIGS. 1-2. The percent control of Palmer amaranth is shown for fields treated with glufosinate alone applied at the labeled rate at 10 am and 10 μm, and for fields treated with a combination of glufosinate and NBD-CL at two rates (6.81 g ai $A^{-1}$ and 109 g ai $A^{-1}$) at 10 pm.

A field experiment was conducted in August in Fayetteville, AR, to evaluate the addition of a broad-spectrum metabolic inhibitor to glufosinate when applied at night. A metabolic inhibitor, 4-chloro-7-nitrobenzofurazan (NBD-CL), was mixed with glufosinate at two rates (6.8 g ai $A^{-1}$ and 109 g ai $A^{-1}$) and applied at 10 pm under dark conditions. Additionally, a "glufosinate alone" treatment was applied at 10 am and 10 pm at 236 g ai $A^{-1}$, for comparison to a standard commercial application and comparison to an application with reduced activity due to a lack of light intensity, respectively (FIGS. 1-2). The combination treatment (Glufosinate+NBD-CL) provided 99% control of 40-inch tall Palmer amaranth when applied at 10 pm at both tested rates (FIG. 3; Table 8). In contrast, when glufosinate alone was applied at 10 am and 10 pm, only 74% and 60% of Palmer amaranth control was achieved, respectively. Thus, the addition of a metabolic inhibitor to glufosinate eliminates variability in its efficacy due to light intensity. According to the label, Palmer amaranth should be less than 4 inches tall when it is treated with glufosinate for effective control. Thus, the addition of this inhibitor allowed glufosinate to control larger than labeled Palmer amaranth.

Figure 4:
FIG. 4 shows a photograph of soybean and cotton plants after treatment with glufosinate and NBD-CL at the indicated rates. The injury to cotton was scored as 11% and the injury to soybean was scored as 22%.
Figure 4:
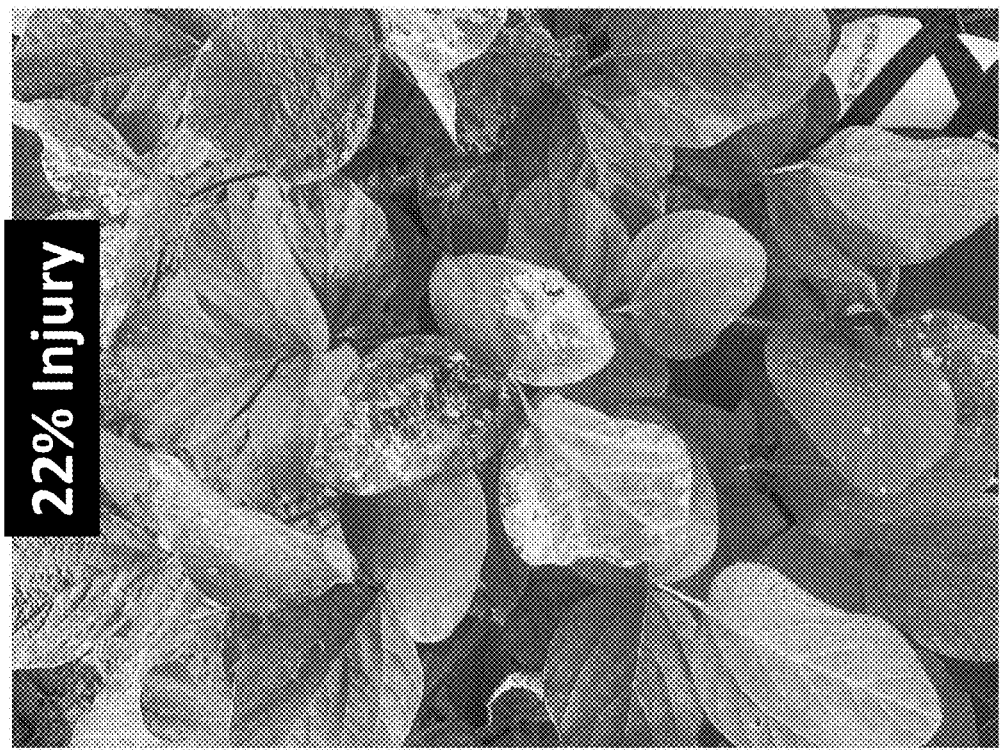

Preliminary field experiments demonstrate that the combination of glufosinate and a metabolic inhibitor is useful for the treatment of crops. Soybean and cotton plants treated with a mixture of NBD-CL at 6.8 g ai $A^{-1}$ and glufosinate at 11:30 am showed commercially acceptable levels of crop damage, 22% and 11%, respectively (FIG. 4).

TABLE 8

Displays observed Palmer amaranth control by treatments from a field experiment conducted in Fayetteville, AR.

| Treatment | Rate (g ai $A^{-1}$) | Time | Palmer amaranth control (%) |
|---|---|---|---|
| Glufosinate | 236 | 10 am | 74b[a] |
| Glufosinate | 236 | 10 pm | 60c |
| Glufosinate + NBD-CL | 236 + 6.8 | 10 pm | 99a |
| Glufosinate + NBD-CL | 236 + 109 | 10 pm | 99a |

Example 2

Field experiments were conducted in Fayetteville, AR, in 2020 to evaluate if the addition of additives mitigates the light dependency of glufosinate. Herbicide treatments are shown in Table 9. Applications of each herbicide treatment were applied at 10 am and 10 pm. Plot size was 1.93 m wide and 6 m long. Herbicide applications were made with hand-held $CO_2$-pressurized sprayers calibrated to deliver 140 L $ha^{-1}$ of spray solution at 6.4 kph. Visual Palmer amaranth/waterhemp control ratings were taken on a scale of 0 to 100%, 0 being no control, and 100 being complete weed death. Biomass of 1 $m^2$ of plot area was taken 28 days after application. Palmer amaranth and waterhemp size at the time of the herbicide application was 25 to 30 cm in height.

Example 3

Figure 8:
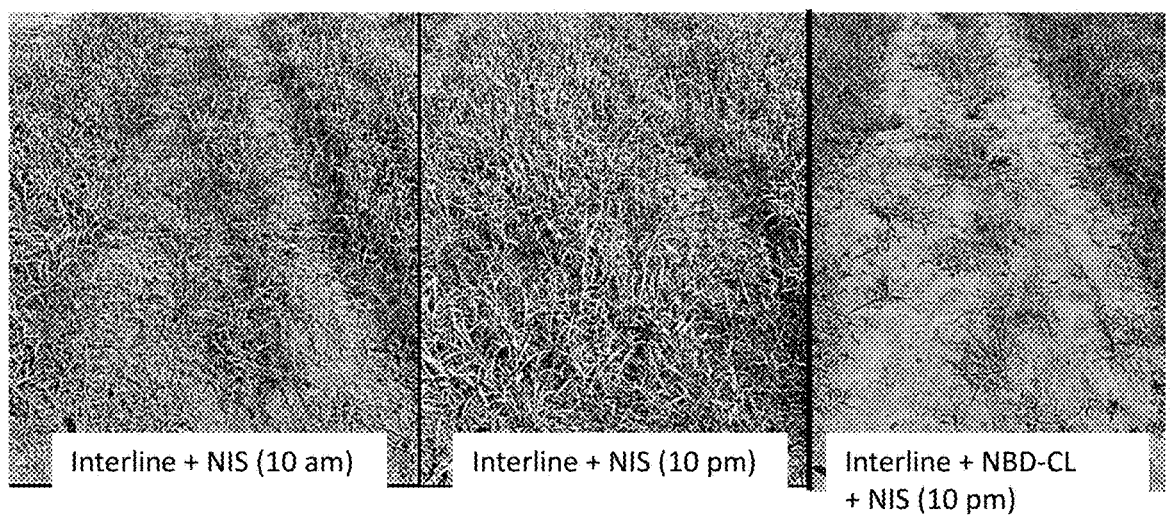
FIG. 8 shows photos of plots in Example 3, which assessed the addition of non-ionic surfactant (NIS) and NIS+NBD-CL to glufosinate at 10 am and 10 pm.

Field experiments were conducted in Fayetteville, AR, in 2020 as in Example 2 but broadleaf signalgrass and tall morningglory size at application was 20- and 15-cm, respectively. (FIG. 8)

Examples 2 and 3 establish that NBD-CL does not have herbicidal activity on its own. (FIGS. 5-7)

Figure 5:
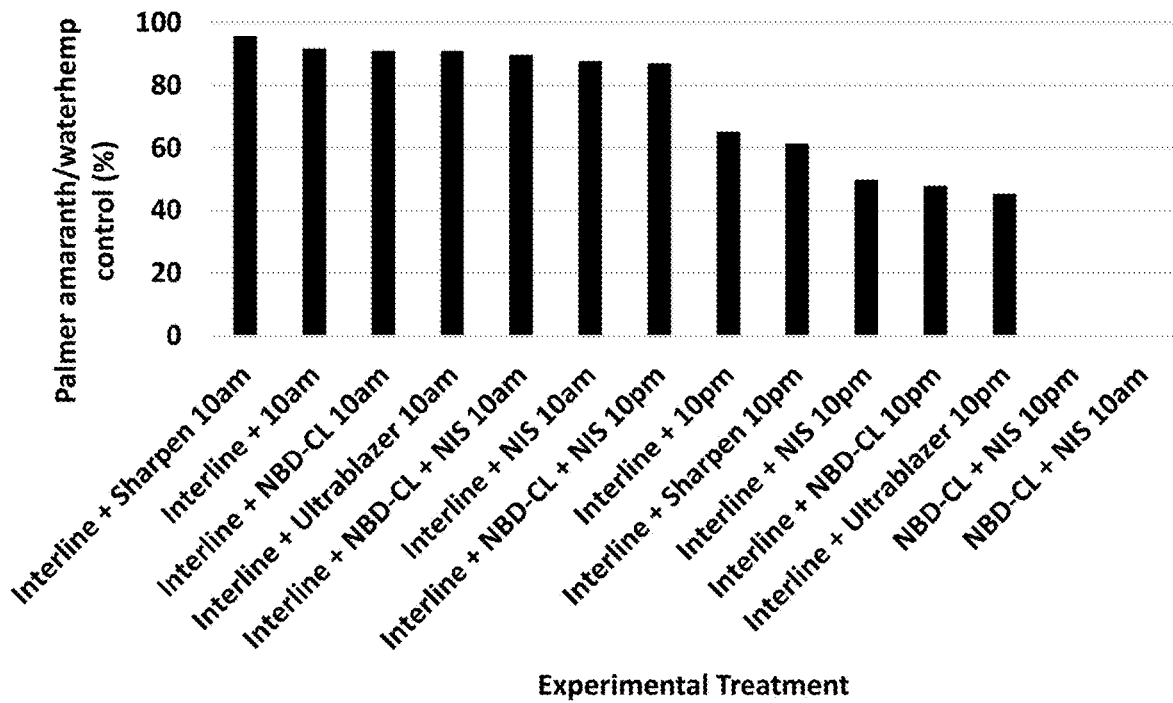
FIG. 5 shows percent control of the native mixture of Palmer amaranth and waterhemp 21 days after the application of the experimental treatments. Interline=glufosinate; Sharpen=saflufenacil; UltraBlazer=acifluorfen
Figure 6:
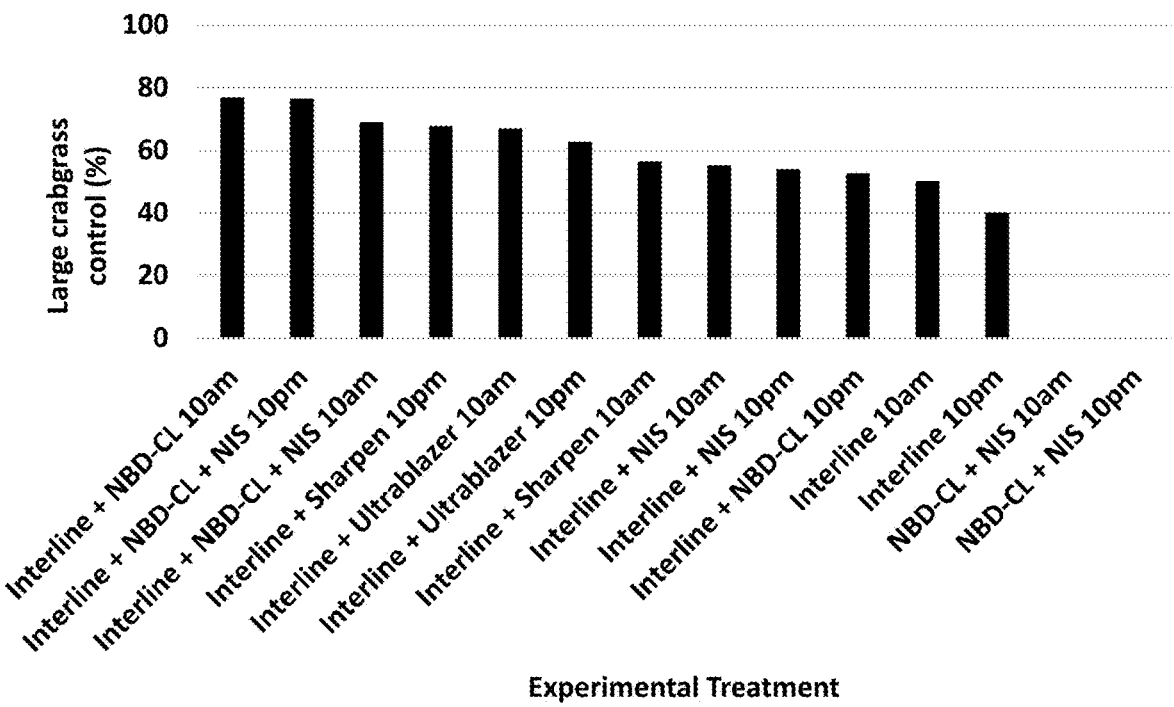
FIG. 6 shows percent control of the native large crabgrass populations 20 days after the application of the experimental treatments. Interline=glufosinate; Sharpen=saflufenacil; UltraBlazer=acifluorfen
Figure 7:
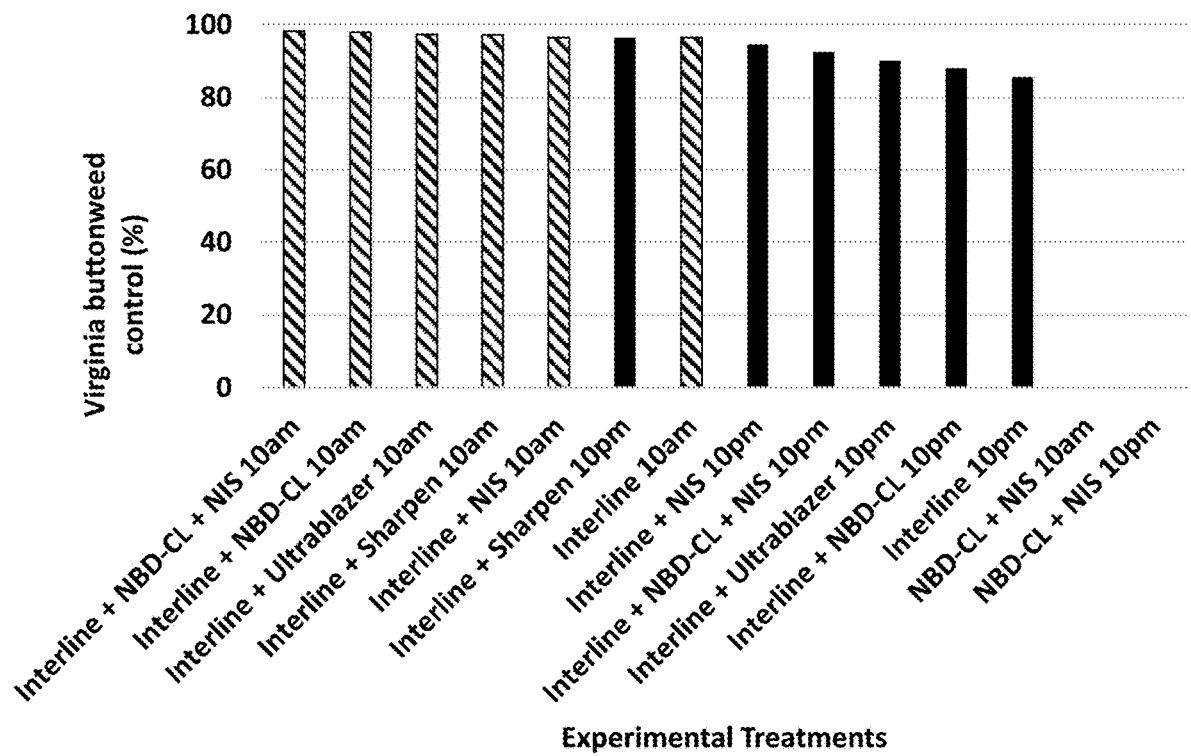
FIG. 7 shows percent control of the native Virginia buttonweed population 20 days after the application of the experimental treatments. Interline=glufosinate; Sharpen=saflufenacil; UltraBlazer=acifluorfen

Moreover, Palmer amaranth, waterhemp, and large crabgrass control with glufosinate+NIS was increased by the addition of NBD-CL in low-light conditions (FIGS. 5-6). The addition of saflufenacil and acifluorfen did not alleviate reductions in weed control due to low-light intensity.

Example 4

A field experiment was conducted in Fayetteville, AR, in 2020 to evaluate if the addition of additives used in Examples 2 and 3 to elicit crop injury. Herbicide treatments are shown in Table 9. Applications of each herbicide treatment were applied at 10 am and 10 pm. Plot size was 3.66 m wide and 6 m long. One row Enlist cotton, XtendFlex cotton, LibertyLink GT27 soybean, and LibertyLink corn was planted on a 0.9 m row spacing. Herbicide applications were made with hand-held $CO_2$-pressurized sprayers calibrated to deliver 140 L $ha^{-1}$ of spray solution at 6.4 kph. Visual crop injury ratings were taken on a scale of 0 to 100%, 0 being no control, and 100 being complete crop death. Biomass of 1 m row of each crop in the plot was taken 28 days after application. Applications of herbicide treatments where made to 3-leaf cotton, V4 soybean, and V4 corn.

Figure 9:
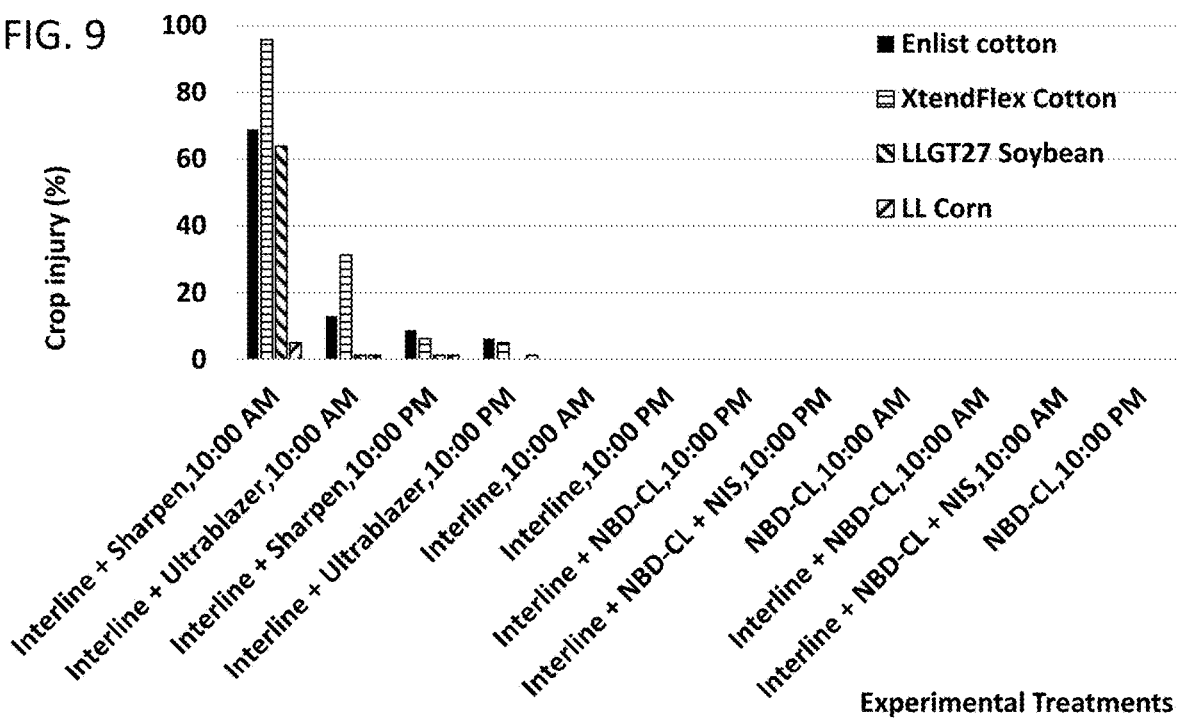
FIG. 9 shows percent crop injury of Enlist cotton, Xtend-Flex cotton, LibertyLink GT27 soybean, and LibertyLink corn 14 days after the application of the experimental treatments. Interline=glufosinate; Sharpen=saflufenacil; UltraBlazer=acifluorfen
Figure 10:
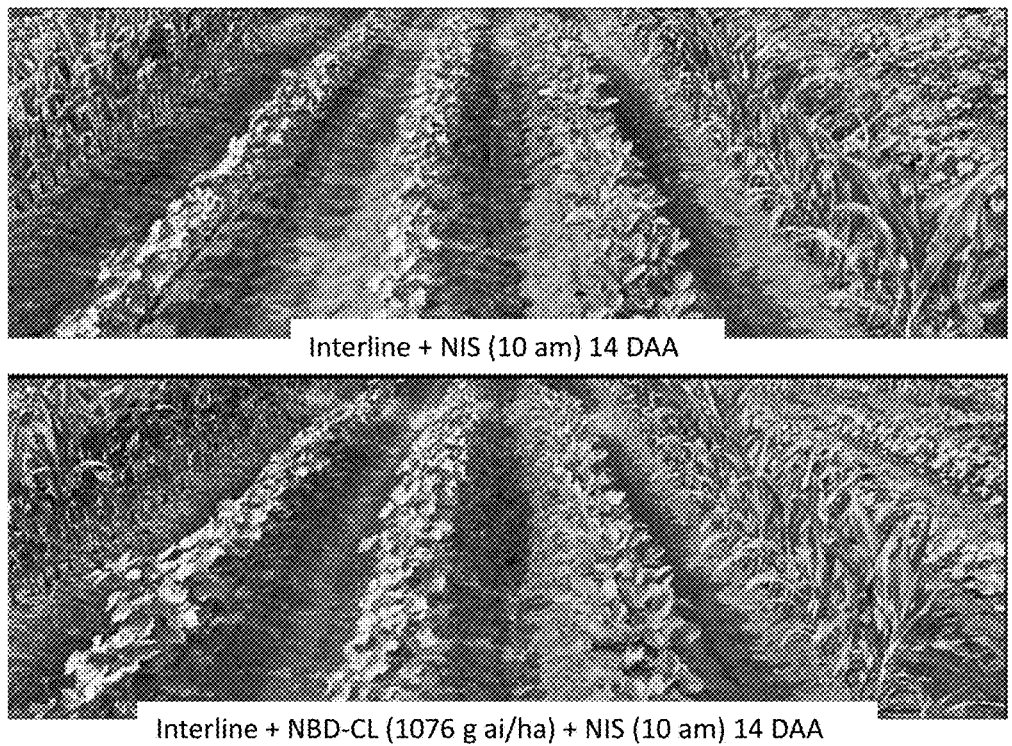
FIG. 10 shows photos taken of plots 14 days after an application of top: Interline (glufosinate)+nonionic surfactant at 10 am, bottom: Interline (glufosinate+NBD-CL (1076 g ai/ha)+nonionic surfactant.

The addition of NBD-CL to glufosinate did not negatively affect Enlist cotton, XtendFlex cotton, LibertyLink GT27 soybean, or LibertyLink corn (FIGS. 9 and 10). Glufosinate and saflufenacil or acifluorfen applied during the day negatively impacted at least one of the crops; therefore, making the mixture unlikely for broad use (FIG. 9). Crop injury caused by applications of glufosinate and saflufenacil or acifluorfen was less when the herbicides were applied at 10 pm versus 10 am (FIG. 9).

TABLE 9

Experimental treatments the associated rates and time of application that were applied in Examples 2, 3, and 4.

| Treatment | Rate | Time of application |
|---|---|---|
| Nontreated | | |
| Glufosinate | 655 g ai/ha | 10 am, 10 pm |
| Glufosinate + NIS[a] | 655 g ai/ha + 0.25% v/v | 10 am, 10 pm |
| NBD-CL[b] + NIS | 269 g ai/ha + 0.25% v/v | 10 am, 10 pm |
| Glufosinate + NBD-CL | 655 g ai/ha + 269 g ai/ha | 10 am, 10 pm |
| Glufosinate + NBD-CL + NIS | 655 g ai/ha + 269 g ai/ha + 0.25% v/v | 10 am, 10 pm |
| Glufosinate + Saflufenacil | 655 g ai/ha + 1 g ai/ha | 10 am, 10 pm |
| Glufosinate + Acifluorfen | 655 g ai/ha + 14 g ai/ha | 10 am, 10 pm |

[a]NIS (nonionic surfactant)
[b]NBD-CL (4-chloro-7-nitro benzoflurazan)

Example 5

A field experiment was conducted in Fayetteville, AR, in 2020 to evaluate if the addition of glyoxylate inhibiting, reactive oxygen species inducing, and glutathione S-transferase inhibiting additives to increase glufosinate efficacy in low-light conditions and maintain low levels of crop response. Additives applied in addition with glufosinate at 655 g ai/ha are displayed in Table 10. Applications of each herbicide treatment was applied at 10 pm. Plot size was 5 m wide and 6 m long. One row Enlist cotton, XtendFlex cotton, LibertyLink GT27 soybean, and LibertyLink corn, Palmer amaranth, and johnsongrass was planted on a 0.9 m row spacing. Herbicide applications were made with hand-held $CO_2$-pressurized sprayers calibrated to deliver 140 L ha$^{-1}$ of spray solution at 6.4 kph. Visual crop injury and weed control ratings were taken on a scale of 0 to 100%, 0 being no control, and 100 being complete crop or weed death. Biomass of 1 m row of each crop and live and dead counts of weed species were taken in the plot 28 days after application. Applications of herbicide treatments where made to 4-leaf cotton, V5 soybean, V5 corn, 25 to 30-cm tall Palmer amaranth, and 15 to 20-cm tall johnsongrass.

The Example establishes that addition of metabolic inhibitors increased efficacy of glufosinate in low-light environments. The finding validates the hypothesis that a reduction in glufosinate efficacy in low-light conditions is due to metabolism of the herbicide before inhibition of the target site, which is only functioning when light is present (FIG. 11-12).

Figure 11:
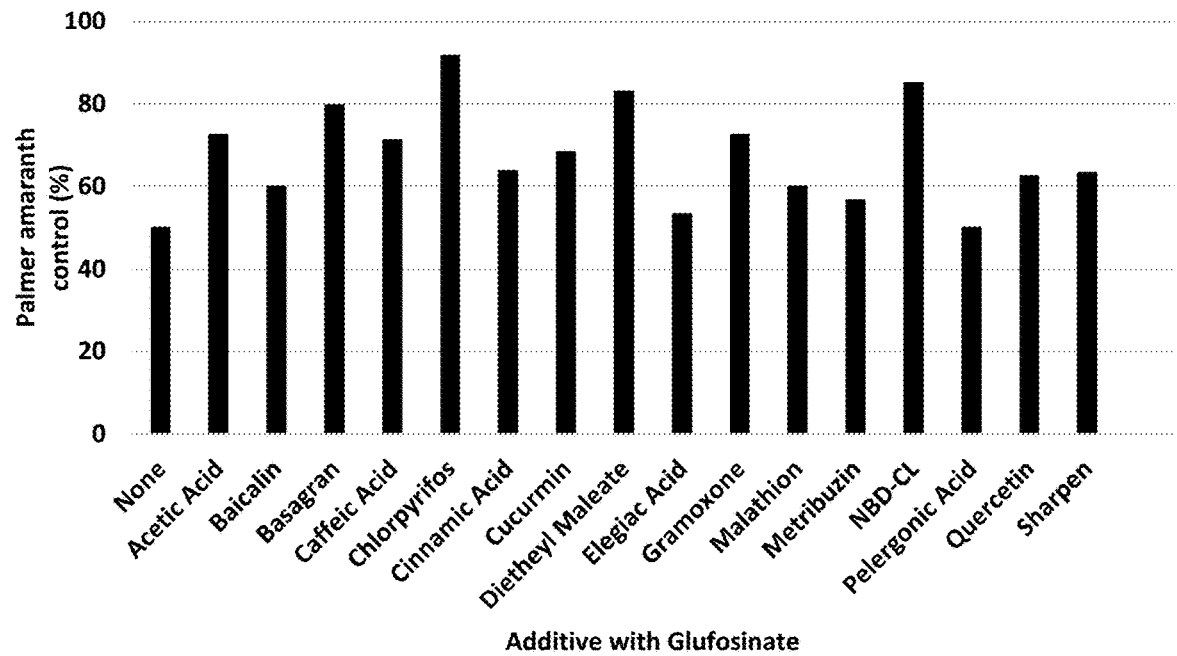
FIG. 11 shows Palmer amaranth control achieved by an application of glufosinate at 655 g ai/ha+an additive at 10 pm at night. Percent control evaluations were taken 21 days after the application. Sharpen=saflufenacil; Basagran=bentazon; Gramoxone=paraquat
Figure 12:
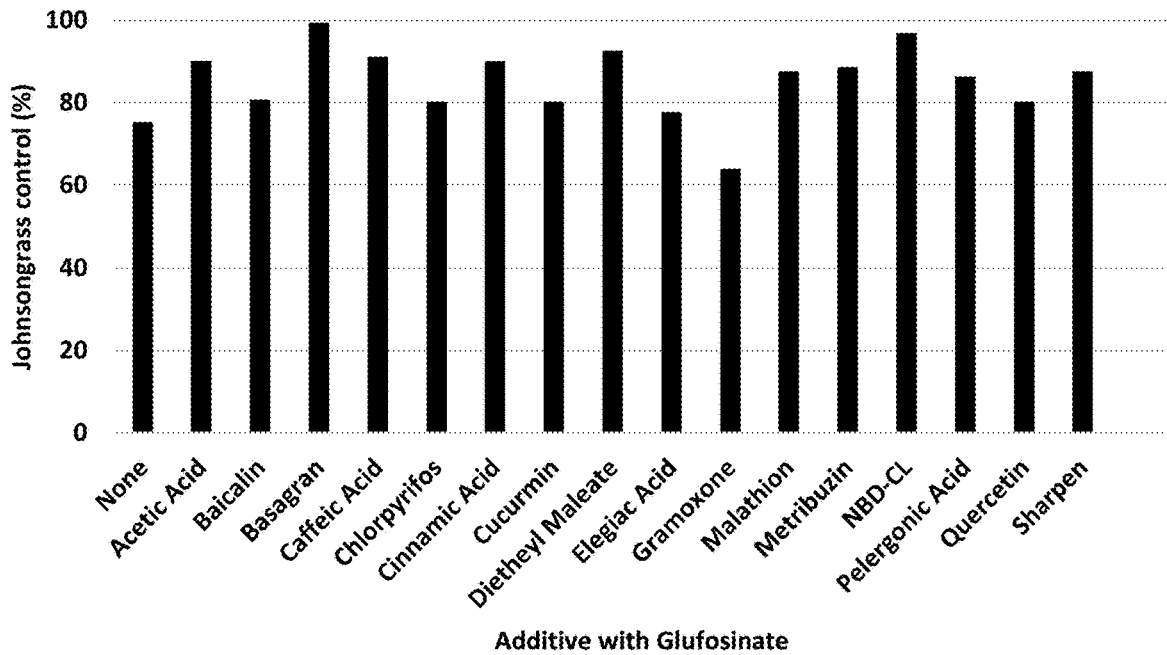
FIG. 12 shows johnsongrass control achieved by an application of glufosinate at 655 g ai/ha+an additive at 10 pm at night. Percent control evaluations were taken 21 days after the application. Sharpen=saflufenacil; Basagran=bentazon; Gramoxone=paraquat
Figure 13:
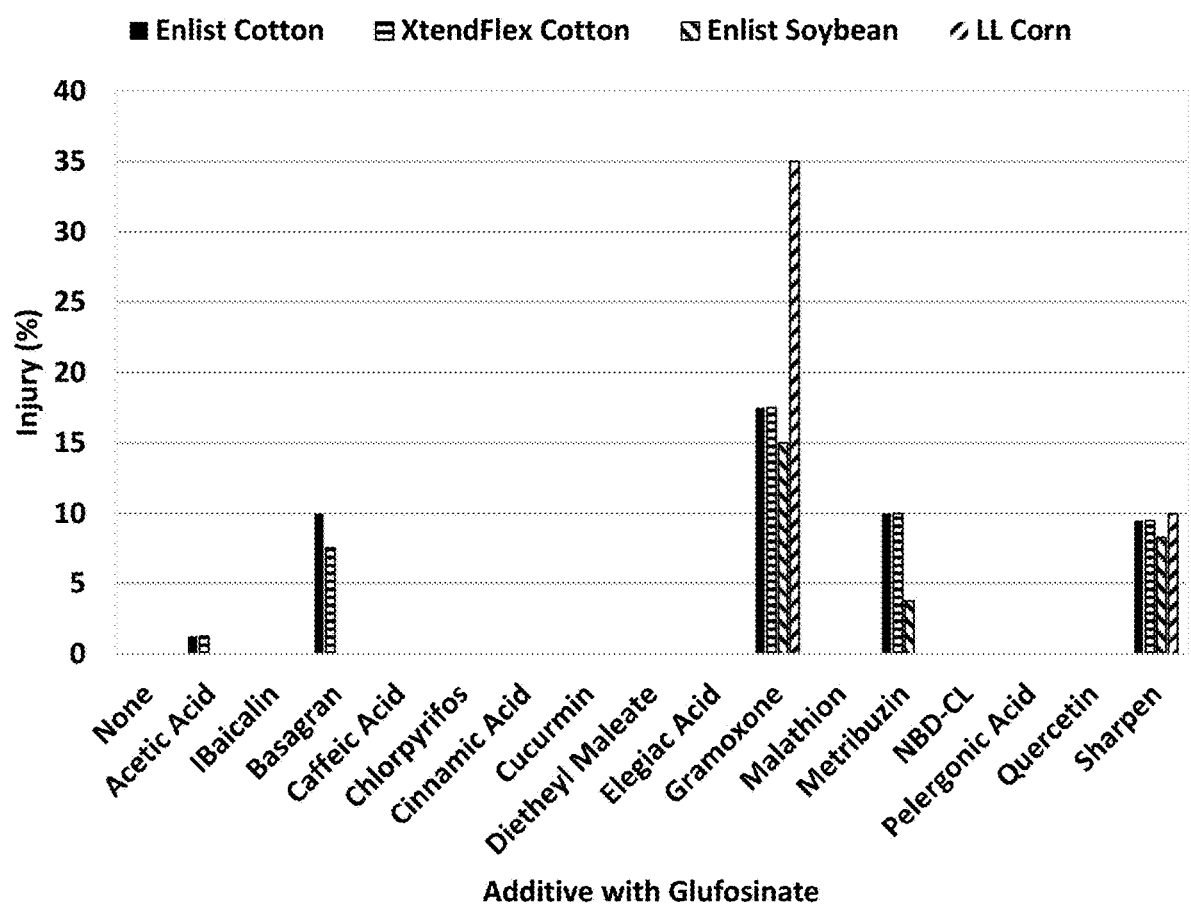
FIG. 13 shows crop injury that was observed from an application of glufosinate at 655 g ai/ha+an additive at 10 pm at night. Percent injury evaluations were taken 21 days after the application. Sharpen=saflufenacil; Basagran=bentazon; Gramoxone=paraquat

Chlorpyrifos, diethyl maleate, and NBD-CL provided the greatest increase in glufosinate efficacy of Palmer amaranth and johnsongrass in low-light conditions, while not eliciting a negative crop response (FIGS. 11-13).

In summary, addition of a metabolic inhibitor to glufosinate alleviates the typical reduction in efficacy observed when applied in low-light conditions. Injury to glufosinate-tolerant crops were not observed when NBD-CL was applied at day or night. other metabolic inhibitors have potential may also alleviate the light dependency of glufosinate.

TABLE 10

List of additives that were mixed with glufosinate in Example 5. Listed are the compounds with the believed mode of action that may benefit glufosinate efficacy, the current commercial uses, and the rate of the compound that was applied.

| Compound | MOA[a] | Current Uses | Rate Tested |
|---|---|---|---|
| NBD-CL | GST[b] inhibitors | Standard GST inhibitor | 280 g ai/ha |
| Elegiac acid | GST inhibitors | Supplement[d] | 280 g ai/ha |
| Cucurmin | GST inhibitors | Supplement | 280 g ai/ha |
| Quercetin | GST inhibitors | Supplement | 280 g ai/ha |
| Baicalin | GST inhibitors | Supplement | 280 g ai/ha |
| Diethyl maleate | GST inhibitors | Insecticide | 280 g ai/ha |
| Malathion | GST inhibitors | Insecticide | 280 g ai/ha |
| Chlorpyrifos | GST inhibitors | Insecticide | 280 g ai/ha |
| Caffeic acid | Glyoxylate pathway inhibition | Skin treatment/supplement | 280 g ai/ha |
| Cinnamic acid | Glyoxylate pathway inhibition | Organic herbicide | 280 g ai/ha |
| Saflufenacil (Sharpen) | ROS[c] inducers | Herbicide | 1 g ai/ha |
| Metribuzin | ROS inducers | Herbicide | 11 g ai/ha |
| Paraquat (Gramoxone) | ROS inducers | Herbicide | 33.5 g ai/ha |
| Bentazon (Basagran) | ROS inducers | Herbicide | 33.5 g ai/ha |
| Pelergonic acid | Unknown | Organic herbicide | 280 g ai/ha |
| Acetic acid | Unknown | Organic herbicide | 280 g ai/ha |

[a]MOA (mode of action)
[b]GST (glutathione s-transferase)
[c]ROS (reactive oxygen species)
[d]Supplement (food grade supplements that are currently commercialized for human consumption)

What is claimed:

1. An herbicide for the control of a grass or a broadleaf weed in a crop, the herbicide comprising an effective amount of glufosinate, or a salt thereof, and an effective amount of a metabolic inhibitor comprising a glutathione S-transferase inhibitor, wherein the glutathione S-transferase inhibitor is baicalin.

2. The herbicide of claim 1, further comprising an adjuvant.

3. The herbicide of claim 2, wherein the adjuvant is a non-ionic surfactant, crop oil concentrate, or methylated seed oil.

* * * * *